(12) United States Patent  
Geng

(10) Patent No.: US 8,471,892 B2  
(45) Date of Patent: Jun. 25, 2013

(54) WIDE FIELD-OF-VIEW REFLECTOR AND METHOD OF DESIGNING AND MAKING SAME

(76) Inventor: Z. Jason Geng, Rockville, MD (US)

( * ) Notice: Subject to any disclaimer, the term of this patent is extended or adjusted under 35 U.S.C. 154(b) by 1461 days.

(21) Appl. No.: 11/984,702

(22) Filed: Nov. 21, 2007

(65) Prior Publication Data

US 2008/0122922 A1    May 29, 2008

Related U.S. Application Data

(60) Provisional application No. 60/867,129, filed on Nov. 23, 2006.

(51) Int. Cl.
*H04N 7/00* (2011.01)

(52) U.S. Cl.
USPC .............................. 348/36; 348/39

(58) Field of Classification Search
USPC .............................. 348/146, 36, 39
See application file for complete search history.

(56) References Cited

U.S. PATENT DOCUMENTS

| | | | | |
|---|---|---|---|---|
| 5,774,569 A * | 6/1998 | Waldenmaier | ................ | 382/100 |
| 5,790,181 A * | 8/1998 | Chahl et al. | ................ | 348/36 |
| 5,990,934 A * | 11/1999 | Nalwa | ................ | 348/36 |
| 6,118,474 A * | 9/2000 | Nayar | ................ | 348/36 |
| 6,226,035 B1 * | 5/2001 | Korein et al. | ................ | 348/335 |
| 6,611,282 B1 * | 8/2003 | Trubko et al. | ................ | 348/36 |
| 6,690,268 B2 * | 2/2004 | Schofield et al. | ................ | 340/438 |
| 7,347,599 B2 * | 3/2008 | Minano et al. | ................ | 362/511 |
| 7,411,729 B2 * | 8/2008 | Iyama et al. | ................ | 359/354 |
| 2005/0086032 A1 * | 4/2005 | Benitez et al. | ................ | 703/1 |

* cited by examiner

*Primary Examiner* — Minh-Chau Nguyen
(74) *Attorney, Agent, or Firm* — Thorpe North & Western LLP

(57) ABSTRACT

A system and method for designing and using freeform reflectors to collect images of a wide angle field-of-view scene is provided. A freeform reflector may enable a wide angle field-of-view to be collected in an unwarped and unwrapped manner such that computer processing may be eliminated. Furthermore, the use of a freeform reflector allows for larger areas of an image sensor chip to be used, thereby providing higher resolution images. Because freeform reflectors may be configured to map a scene onto the image sensor chip in a scalar and mathematically correct manner, output images may be directly displayed from the image sensor chip. Wide angle field-of-view imaging systems, such as surveillance, alarm, and projector system, may utilize freeform reflectors as provided herein.

20 Claims, 15 Drawing Sheets

WIDE FIELD-OF-VIEW REFLECTOR AND METHOD OF DESIGNING AND MAKING SAME

CROSS-REFERENCE TO RELATED APPLICATION

This applications claims priority to U.S. Provisional Patent Application Ser. No. 60/867,129, filed on Nov. 23, 2006, the entire contents of which are incorporated herein by reference.

BACKGROUND

In the 19$^{th}$ century, numerous still-picture cameras were created for taking panoramic still pictures through split-rotating mechanisms. Straight forward, yet tedious, procedures were used to first capture multiple still pictures of a surrounding scene and then stitch the pictures together as a seamless panoramic image. Even today, these types of cameras utilize mechanical moving parts and need tedious manual procedures to process multiple pictures in a panoramic view. Ultimately, these types of cameras are inherently awkward and cannot be used to generate wide field-of-view real-time video. The term "wide angle field-of-view" may vary for different applications. For example, for automobile rearview mirrors, a wide angle field-of-view may range between 30 degrees and 90 degrees. However, for other applications, such as surveillance systems, wide angle field-of-view may range between 100 degrees and 360 degrees. It should be understood that different applications may have generally understood fields-of-view that have industry accepted ranges, where a wide angle field-of-view is considered above a certain field-of-view value or within a range of values of fields-of-view.

With rapid advances in high-resolution charge-coupled device or complementary metal oxide semiconductor (CCD/CMOS) video sensor technology in recent years, much research went into developing video cameras and techniques that can simultaneously provide a 360° field-of-view. Resulting from the research and development of high-resolution CCD-CMOS video sensor technology, most 360° video cameras use conventional optics with fisheye lenses or omni-directional mirrors to obtain the 360° field-of-view. FIG. 1 shows a conventional wide angle video surveillance system 100 for capturing a scene up to a 360° field-of-view. Two alternative and different input elements are typically used for capturing a wide-angle field-of-view image of a scene, where the two different input elements include an omni-directional mirror capturing system 102a and a fisheye lens image capturing system 102b. These two different wide angle field-of-view image capturing systems 102a and 102b use different techniques for viewing a scene, but produce similar images. Each of the wide angle field-of-view image capturing systems 102a and 102b use CCD/CMOS image sensors 104a and 104b to collect video images of the scene. However, the wide angle field-of-view sensing system 102a uses an omni-directional lens 106 to reflect images of the scene onto the CCD/CMOS image sensor, while the wide angle field-of-view imaging system 102b uses a fisheye lens 108 to collect images of the scene and focus the images onto the CCD/CMOS image sensor 104b. Although each of these two systems 102a and 102b use different image capturing techniques (i.e., reflective omni-directional mirror versus fisheye lens), a resulting image of each of the two techniques is captured onto a CCD/CMOS image sensor chip that is typically rectangular.

A typically CCD/CMOS image sensor chip is formed of a pixel array having a 4:3 ratio of width to height. As shown, a CCD/CMOS image sensor chip 110 is formed of pixels, and an image is imaged onto the CCD/CMOS image sensor chip 110 in an image area 112 that is circular in nature. An image 114 within the image area 112 is shown to be highly distorted, circular, and not suitable for direct viewing. In addition, the image area 112 utilizes only approximately 58% of the pixels available on the CCD/CMOS image sensor chip 110, which means that approximately 42% of the pixels on the CCD/CMOS image sensor chip 110 are not used. This low rate of pixel utilization significantly deteriorates resolution of a final video output due to an entire image being compressed into a small area of pixels.

FIG. 2 is an illustration of an exemplary image sensor chip 200 that shows an image area 202 imaged onto the image sensor chip 200 as a result of a traditional fisheye lens or parabolic mirror that generates circular images. Because the image is circular, it uses a relatively small portion of effective pixels on the CCD/CMOS sensor chip 200. Because only a small portion of the pixels are used, resolution is compromised during video processing to unwrap the circular image in the image area 202 and enlarge the image to be displayed on a video display or storage on a storage medium, such as a computer disc or memory.

Continuing with FIG. 1, to facilitate visualization of the image 114 that is imaged onto the CCD/CMOS image sensor chip 110, a computing system 116 is typically used to digitally resample and unwrap the image 114 displayed in a circular image in the image area 112 to produce rectangular image in which the abscissa represents azimuth and ordinate elevation. An unwrapped and unwarped image 118 is shown to be output from the computing system 116. The computing system 116 uses complex software to perform the unwarping, unwrapping, and other correction of the image. However, because the digital unwarping requires external computation resources, a wide angle field-of-view system is increased in cost, complexity, and size. Because of these and other issues, wide angle field-of-view video cameras have not yet found wide-spread applications.

Fisheye lenses and reflective omni-directional mirrors are often used for wide angle field-of-view imaging systems because these optical elements are rotationally symmetric. Although a fisheye lens is conceptually relatively easy to build, fisheye lenses generally include multiple lenses. These multiple lenses or multistage lenses may introduce strong optical aberrations, which, in turn, need additional lenses to correct. As a result, fisheye lenses and other rotationally symmetric optical elements generally require more complex optics for an entire system, are bulky in size and weight, and expensive in cost. In general, wide angle field-of-view systems that use rotationally symmetric optical elements use computing systems to alter a sensed image to be properly viewed by a person (e.g., without being wrapped or warpped). In addition to the problem of low pixel utilization of a CCD/CMOS sensor chip, fisheye lenses also suffer severe axial unevenness of pixel resolution (i.e., a peripheral edge has much lower pixel resolution than in the center area). For most surveillance systems, the ability to detect targets in peripheral areas may be as or more important than in a central area of an image since better early warning procedures may be taken if a target can be detected at a far distance.

Omni-directional reflective mirrors are generally used with wide angle video cameras based on Catadioterics framework. One advantage of using a mirror instead of a lens is that a mirror may have a simple structure and much less color aberration than a lens. Hyperbolic mirrors and other omni-directional shaped mirrors are utilized with wide angle video cameras. However, as previously described, the use of such mirrors results in circular images on image sensor chips, thereby having reduced resolution due to using a portion of an image sensor chip and requiring a computing system to unwarp and unwrap an image having a wide angle field-of-view.

SUMMARY

To overcome the problem of wide angle field-of-view video imaging having distorted and low resolution images, and requiring computers to unwarp and unwrap images generated from the use of omni-directional reflector lenses and fisheye lenses, the principles of the present invention provide for using freeform reflectors to collect images of a wide angle field-of-view scene. A freeform reflector may enable a wide angle field-of-view to be collected in an unwarped and unwrapped manner such that computer processing may be eliminated. Furthermore, the use of a freeform reflector allows for larger areas of an image sensor chip to be used, thereby providing higher resolution images. Because freeform reflectors may be configured to map a scene onto the image sensor chip in a scalar and mathematically correct manner, the principles of the present invention may be used to directly output images from the image sensor chip to an output device, such as an electronic display.

One embodiment of a reflector may include a freeform surface being reflective and having a shape defined by a mapping to reflect and map an electromagnetic signal onto a sensor defined by pixels arranged in a geometric shape. The reflective surface may be an optical reflective surface and the electromagnetic signal may be an optical image having a field-of-view ranging up to 360°. The mapping may cause the electromagnetic signal to be redistributed when imaged on the sensor. The redistribution may minimize or eliminate distortion of a scene being imaged on the sensor. The redistribution of the electromagnetic signal may implement a certain mathematical function such that the electromagnetic signal mapped onto the sensor is a corrected signal that does not need to be corrected digitally or otherwise.

One embodiment of a method of collecting an electromagnetic signal may include acquiring an electromagnetic signal representing a predefined field-of-view of a scene. The acquired electromagnetic signal may be reflected from a freeform surface configured by a predefined mapping function to map the acquired electromagnetic signal onto pixels of the sensor. The reflected electromagnetic signal may be sensed as mapped from the predefined field-of-view of the scene by the pixels of the sensor. The reflected electromagnetic signal may be an optical signal. The pixels of the sensor may have a predetermined shape that is used in defining the predefined mapping function. In one embodiment, the field-of-view may a wide angle field-of view that ranges up to 360°. In reflecting the acquired electromagnetic signals, an optical processing of the electromagnetic signal is caused to occur prior to the reflected electromagnetic signal being sensed.

One embodiment for designing a freeform reflector may include defining a scene having a predetermined wide angle field-of-view. Sensor parameters of a sensor having a pixel configuration arranged to sense an electromagnetic signal may be determined. A mapping relationship between the scene and sensor parameters may be defined. A mapping function that causes the scene to be reflected onto the sensor pixels based on the defined mapping relationship between the scene and the sensor parameters may be generated, where the mapping function defines a freeform reflector. The freeform reflector may be used for wide angle field-of-view video generation without having to use digital signal processing to unwarp and unwrap an image of the wide angle field-of-view. The scene may be defined to have a field-of-view ranging up to 360°.

Another embodiment of designing a mirror may include defining a scene having a predetermined field-of-view. First and second subscenes of the scene may be defined. Sensor parameters of an optical sensor having a pixel array configuration may be determined. First and second sub-arrays of the optical pixel array may be defined, where the second sub-array may be mutually exclusive of the first sub-array. A first mapping relationship between the first sub-scene and first sub-array may be defined, and a second mapping relationship between the second sub-scene and second sub-array may be defined. A first mapping function may be generated that, when used to define a first portion of a freeform optical reflective surface, causes the first sub-scene to be reflected from the first portion of the freeform optical reflective surface onto the first sub-array. A second mapping function may be generated that, when used to define a second portion of a freeform optical reflective surface, causes the second sub-scene to be reflected from the second portion of the freeform optical reflective surface onto the second sub-array. Through the mapping functions, the mirror may be defined.

One embodiment of a video surveillance system may include an optical sensor configured to sense optical signals of a scene through a wide angle field-of-view and to generate electrical signals in response to sensing the optical signals. A freeform mirror may be configured to reflect the optical signals onto the optical sensor. An output device may be responsive to the electrical signals generated by the optical sensor to generate an output signal. In one embodiment, the output device is an electronic display. Alternatively, the output device may be a storage medium. The freeform mirror may be configured to be positioned in a location to reflect a panoramic view of a scene onto the optical sensor. The freeform mirror may be configured to be positioned in a location to reflect a hemispheric view of the scene onto the optical sensor. Alternatively, the freeform mirror may be configured to be positioned in a location to reflect a panoramic view of the scene onto the optical sensor. The electrical signal generated by the optical sensor may produce an unwarped image without image processing performed thereon. In one embodiment of an application, the wide angle field-of-view may be greater than approximately 120°.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
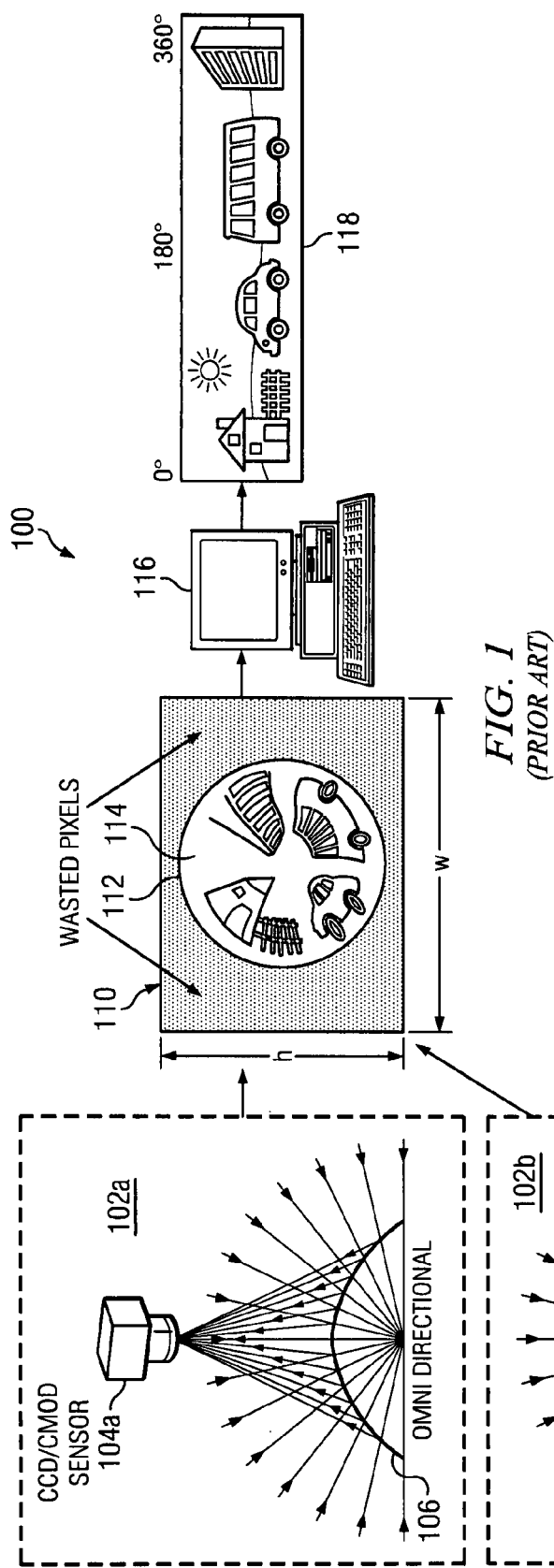
FIG. 1 is an illustration of a conventional image capturing system for capturing wide angle field-of-view images of a scene using fisheye optics or an omni-directional mirror.
Figure 2:
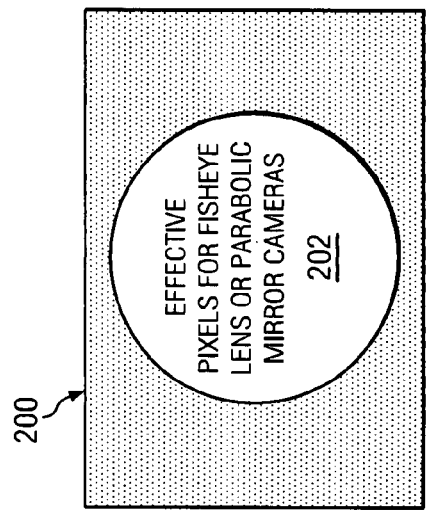
FIG. 2 is an illustration of a conventional image projected onto an image sensor chip.
Figure 3:
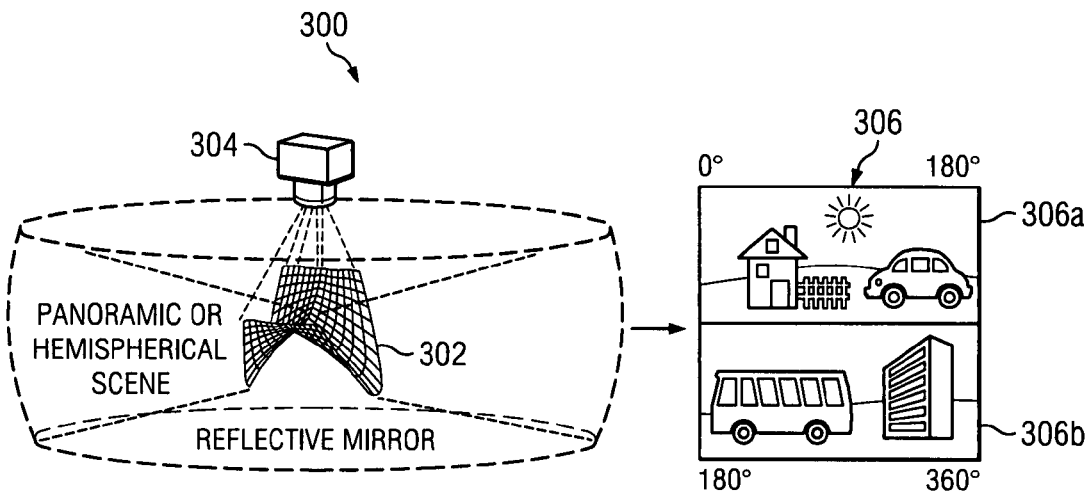
FIG. 3 is an illustration of an exemplary image capturing system using a freeform reflector for capturing panoramic or hemispherical scene images.

FIG. 3 is an illustration of an exemplary image capturing system 300 using a freeform reflector 302 for capturing panoramic or hemispherical images of a scene. The image capturing system 300 uses a freeform reflector 302, which is a rotationally non-symmetric reflector (e.g., mirror), to map a wide angle field-of-view scene onto an image sensor system 304. The image capturing system 300 may be configured to substantially fully utilize resolution of the image sensor system 304. The image sensor system 304 may include an image sensor chip or image sensor, such as a CCD or CMOS image sensor chip, that is of any configuration. For example, the image sensor may be configured as a rectangle having a 4:3 ratio of width to height. The freeform reflector 302 may reflect a wide angle field-of-view onto the image sensor chip of the image sensor system 304 such that an image of the scene covers substantially the entire image sensor chip, thereby utilizing substantially full resolution of the image sensor chip. In addition, the freeform reflector 302 may have a geometric configuration that performs a mathematical function to map the scene onto the image sensor chip such that no digital processing is needed to correct, unwarp, or unwrap the image of the wide angle field-of-view scene, as shown in output image 306. The output image 306 includes an upper half 306a and a lower half 306b, where the upper half 306a is an image of the scene between 0° and 180°, and the lower half 306b is an image of the scene between 180° and 360°. Because no or minimal image processing is needed once the image is collected by the image sensor 304, the image capturing system 300 may be reduced in cost and size. In one embodiment, minimal image processing may include color correction or color enhancement, such as generating a visual image of an image in a non-visible portion of the electromagnetic spectrum (e.g., infrared or ultraviolet). In another embodiment, because the freeform reflector 302 is defined by a mathematical mapping function to map from one space to another, no image processing, either using software or hardware, to perform a mapping function is utilized.

Figure 4:
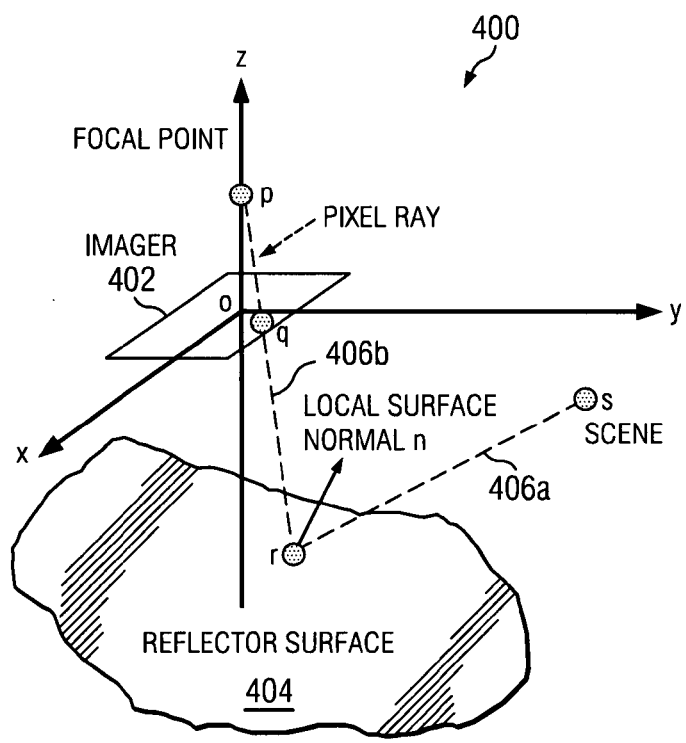
FIG. 4 is an illustration of an exemplary coordinate system showing scene images being collected on an image sensor chip by being reflected from a freeform reflector.

FIG. 4 is an illustration of an exemplary coordinate system 400 showing a scene image point s being mapped on an image sensor chip 402 by being reflected from a freeform reflector 404. An arbitrary scene-to-image mapping relationship may be formed for any point s in a scene onto a corresponding point q on an image plane of the image sensor 402 via a reflecting point r on the freeform reflector 404. A ray 406a may be incident to reflection point r and reflect a ray 406b toward a focal point p, which causes the ray 406b to be incident to the image sensor 402 at image point q. In accordance with the principle of the present invention, the reflector 404 may be designed by defining a mapping relationship between the scene and image sensor 402 to define a reflector surface profile. In doing so, a surface of the freeform reflector 404 may be defined by vector manipulation of the incident ray 406a and reflected ray 406b to compute a normal vector n. In other words, a composite of normal vectors across reflection points may be used to define a surface of the freeform reflector 404. In one embodiment, vector manipulation to generate a normal vector n includes performing a cross-product. In the case of a 360° video camera design, a scene-to-image mapping relationship can be defined so as to map an entire panoramic or hemispherical scene image onto an image plane of the image sensor 402 according to a prescribed order. A prescribed order defines locations at which points of a scene are mapped onto the image sensor 402. For example, a scene may start at angle 0°, which may correspond to a top left pixel on the image sensor 402. At 1° within the scene, a corresponding pixel location may be X pixels to the right of the top left pixel of the image sensor 402. As the scene progresses to 180°, a corresponding location on the image sensor may be at a top right pixel of the image sensor 402. By defining a mapping from the scene onto the image sensor 402, a determination of a reflector 404 may be made in a precise manner, thereby defining a relationship in mathematical terms that causes the scene to be reflected onto the image sensor 402 in a predetermined manner or order.

In general, a theoretical closed-form solution for N(r) with an arbitrary defined mapping relationship is difficult. With a probability of 1, there are no theoretical closed-form solutions to a general design problem. Instead of operating in a universal reflector design theory platform, a computational method for designing a freeform reflector that is able to produce accurate reflector surface geometry to realize arbitrary and desirable imager-to-scene mapping relationships is described herein with regard to FIG. 5.

Figure 5:
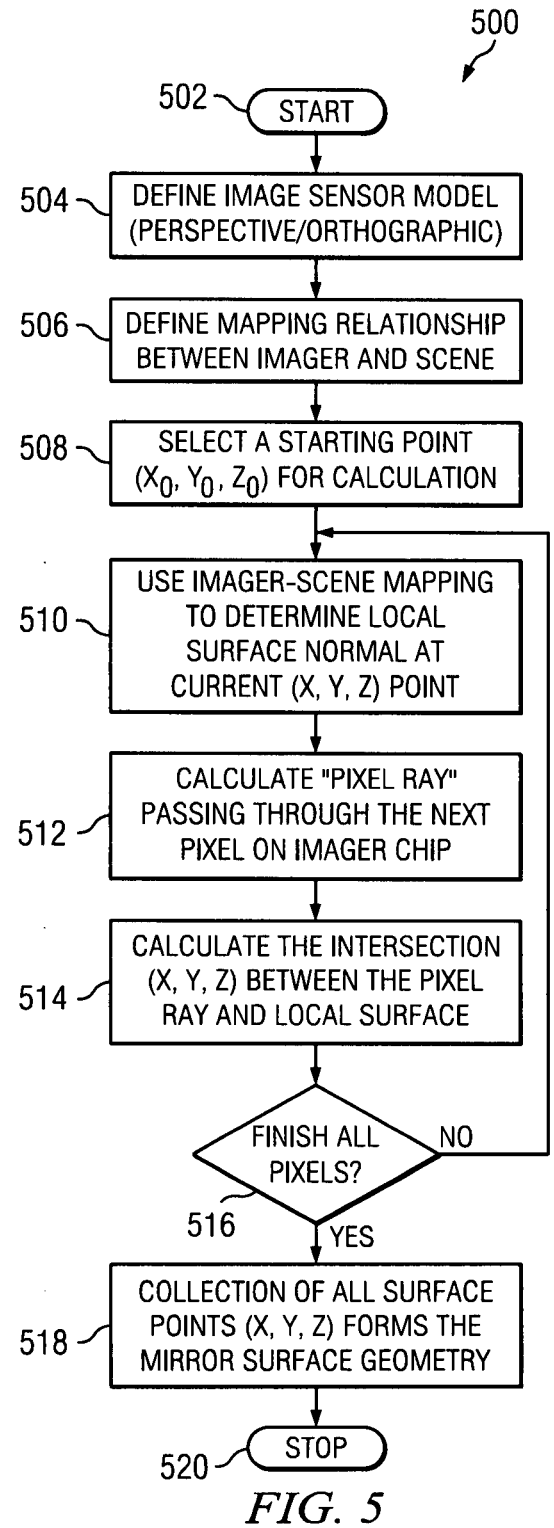
FIG. 5 is a flowchart of an exemplary process for designing a freeform reflector in accordance with the principles of the present invention.

FIG. 5 is a flowchart of an exemplary process 500 for designing a freeform reflector in accordance with the principles of the present invention. The process 500 starts at step 502. At step 504, an image sensor model is defined. The image sensor model may be defined to be perspective, orthographic, or any other image model as understood in the art. At step 506, a mapping relationship between an imager (i.e., image sensor) and scene may be defined. At step 508, a starting point $(x_0, y_0, z_0)$ may be selected for performing a mapping calculation. The starting point $(x_0, y_0, z_0)$ is defined as a point on a reflector surface r. The point $r(x_0, y_0, z_0)$ is typically determined by system design parameters, such as stand-off distance, mirror size, or any other system design parameter. One technique for defining surface shape of a reflector is to determine a surface normal at any point on the reflector surface.

At step 510, an imager-to-scene mapping may be used to determine a local surface normal at current (x, y, z) point. In accordance with the principles of the present invention, the program may calculate the surface normal at the current surface point (x, y, z) based on a pre-defined imager-to-scene mapping and the reflection law of optics, where an incident angle equals a reflection angle on a reflection surface, such as a mirror. The normal vector is given by:

$$N(r) = \|q - r\| + \|s - r\| = \frac{q-r}{|q-r|} + \frac{s-r}{|s-r|} = [\, n_x \quad n_y \quad n_z \,]^T$$

where point q on the image plane corresponds to point s in the scene via reflecting point r on the reflector surface.

At step 512, a "pixel ray" (i.e., an electromagnetic signal, such as a light ray, that is mapped onto a pixel of a sensor) passing through a next pixel on the image sensor chip may be calculated. The location of a current surface point $r(x_0, y_0, z_0)$ and local surface normal $N(x_0, y_0, z_0)$ determines a local surface. The process 500 propagates from "current surface point" to a "next surface point" by solving for an intersection point of "current surface" with the pixel ray. To obtain the next surface point $r(x_0, y_0, z_0)$, the process 500 calculates the pixel ray based on projection geometry and the pixel location on the image sensor chip:

$$Q(r) = \frac{[\, Qx \quad Qx \quad Qx - F \,]^T}{\|[\, Qx \quad Qx \quad Qx - f \,]^T\|} = [\, q_x \quad q_y \quad q_z \,]^T$$

At step 514, an intersection point (x, y, z) between the pixel ray and local surface may be calculated. In determining the intersection point (x, y, z), a linear equation may be computed to locate the coordinates of the next intersection point r:

$$Ar = B, \text{ where } A = \begin{bmatrix} n_x & n_y & n_z \\ 1/q_x & -1/q_y & 0 \\ 0 & 1/q_y & -1/q_z \end{bmatrix},$$

$$B = \begin{bmatrix} n_x R_x + n_y r_y + n_z R_z \\ Q_x/q_x - Q_y/q_y \\ Q_y/q_y - Q_z/q_z \end{bmatrix}$$

At step 516, a decision is made to determine whether all the pixels have been mapped with scene locations to define an accurate surface geometry of a reflector that implements the prescribed imager-to-scene mapping. If all the pixels have not been completed, then the process returns to step 510. Alternatively, if the pixels have all been mapped, such that the entire surface of the reflector has been defined, then the process continues at step 518, where a collection of the surface points (x, y, z) forms the reflector surface geometry. In one embodiment, the normal vectors from each of the surface points (x, y, z) that define the reflective surface are collected for use in manufacturing the reflective surface. The process 500 stops at step 520.

The process 500 is exemplary and may be used for determining surface points for any size or shape of freeform reflector. For example, one embodiment of a freeform reflector may include a mirror having miniature (e.g., nanometer) dimensions for use in cell phone cameras, for example. Another embodiment of a freeform reflector may have larger (e.g., centimeter) dimensions for use in a surveillance camera. It should be understood that the principles of the present invention provide for an infinite number of sizes and shapes use in different applications. In addition, the surface points defined by local surface normal vectors may be used to generate a mold to produce reflectors having a surface geometry the same or substantially the same as defined by the surface points. In one embodiment, a diamond turning or molding technique as understood in the art may be used in constructing a freeform reflector. Other techniques for making a freeform mirror may be utilized.

Although the description presented herein refer to the "imager-to-scene" map that can be implemented by the freeform reflector being from the scene field-of-view to an imager, the reflector and its design methodology can implement any general optical mapping relationship between the output of an upstream optical system, such as an objective lens module, and the downstream optical system, such as another lens module, for performing image aberration correction. The reflector can serve as a component in a complex system, such as a video system. Many modifications and variations will be apparent to one skilled in the art.

FIGS. 6A-6D are illustrations of an exemplary coordinate system 600 of a panoramic imaging system showing an exemplary mapping for imaging onto an image sensor using a freeform reflector. A 360° panoramic cylinder 602 representative of a scene may be mapped onto an image sensor 604. The mapping may be performed by using a perspective model and projection geometry. The projection geometry is based on reflecting a source point from a freeform mirror 606 at a reflection point r through the image sensor 604 at an image point q to a focal point p. In one embodiment, the imager-scene mapping relationship maps the entire 360° panoramic scene onto two rectangular bands on the imager 604, where each rectangular band has a 180° scene coverage (i.e., 180° around the panoramic cylinder 602).

Figure 6A:
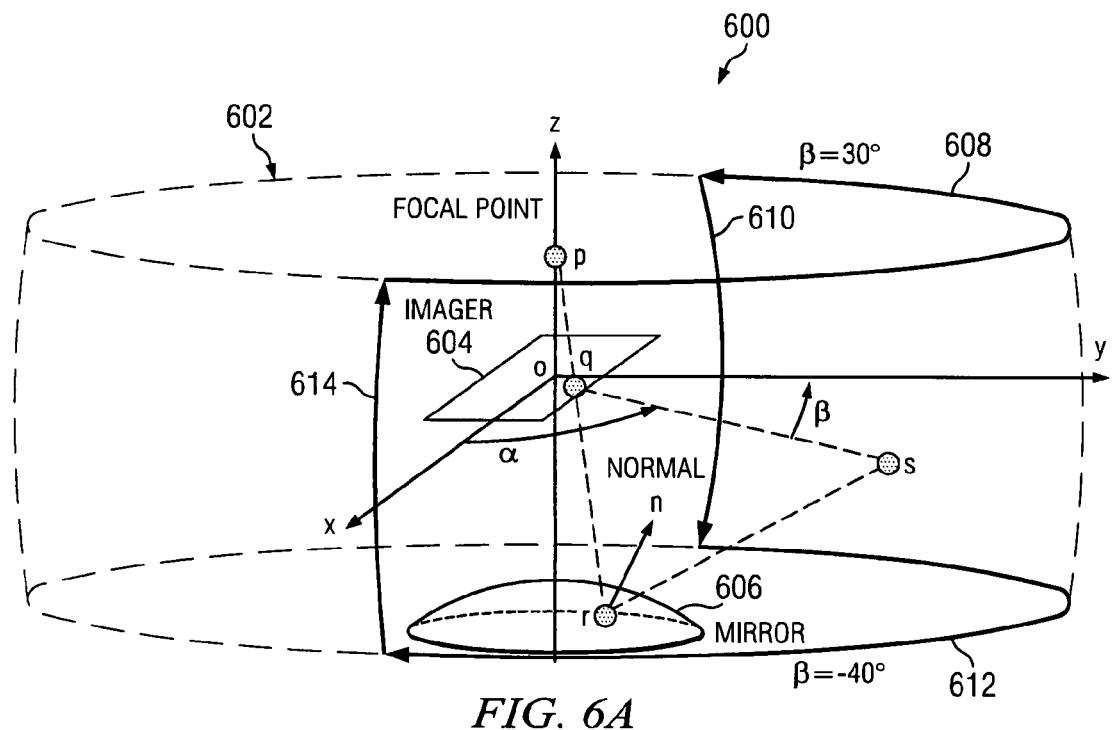
FIGS. 6A-6D are illustrations of an exemplary coordinate system of a panoramic imaging system showing an exemplary mapping for imaging onto an image sensor using a freeform reflector (FIG. 6C)
Figure 6B:
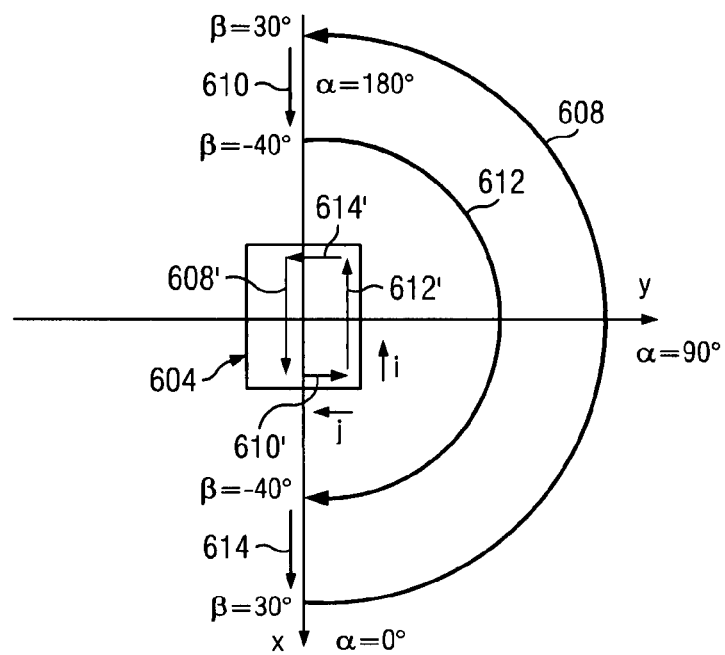

Mapping and order of the scene on the panoramic cylinder 602 is shown between FIGS. 6A and 6B. A scene path 608 having a positive β=30° extending from a +x-axis to −x-axis along an upper edge of the panoramic cylinder 602 is reflected from the freeform mirror 606 and imaged onto the image sensor 604 along an image path 608'. As further shown, scene path 610 that extends from scene path 608 to a β=40° is reflected from the freeform mirror 606 and projected onto the image sensor 604 along image path 610'. Scene path 612 that extends along a lower edge of the panoramic cylinder 602 having a β=−40° is reflected from freeform mirror 606 to image sensor 604 along image path 612'. Scene path 614, which extends from scene path 612 back to scene path 608 is reflected from freeform mirror 606 and projected onto the image sensor 604 along image path 614'. The projections of the scene path 608-614 onto the image sensor 604 having image paths 608'-614' show the mapping and order of the different areas of the panoramic cylinder 602 that are imaged by the image sensor 604.

The freeform reflector 606 may have its surface defined by mapping source points along the panoramic cylinder 602 onto the image sensor 604, as previously described. That is, the source points are reflected from the freeform reflector 606 at a reflection point r to a mapped image point q and a normal vector n is computed by a cross-product calculation of the source s to reflection point r vector and reflection point r to image point q vector, as understood in the art. The normal points are used to define the surface of the freeform reflector 606. It should be understood that the surface of the freeform reflector 606 is a function of how a designer desires to map the scene onto the image sensor.

Figure 6C:
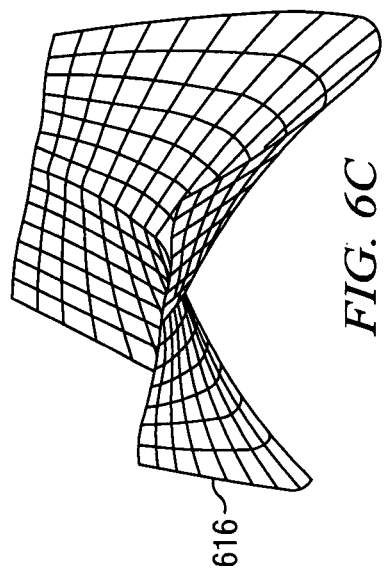

FIG. 6C is an illustration of an exemplary freeform reflector 616. The complex shape of the reflective surface of freeform reflector 616 is a function of normal vectors resulting from the mapping of the panoramic cylinder 602 onto the image sensor 604 of FIGS. 6A and 6B. As shown, the freeform reflector 616 is curvilinear, which may include linear and nonlinear regions. The image sensor 604 that receives the mapped images of the scene from the freeform reflector 616 may convert the images into electrical signals that may be displayed directly or indirectly by an electronic display. Such a display of an image of a scene is shown in FIG. 3, where the scene is mapped between 0° and 180° on a top portion 306a and 180° to 360° on a lower portion 306b.

Figure 6D:
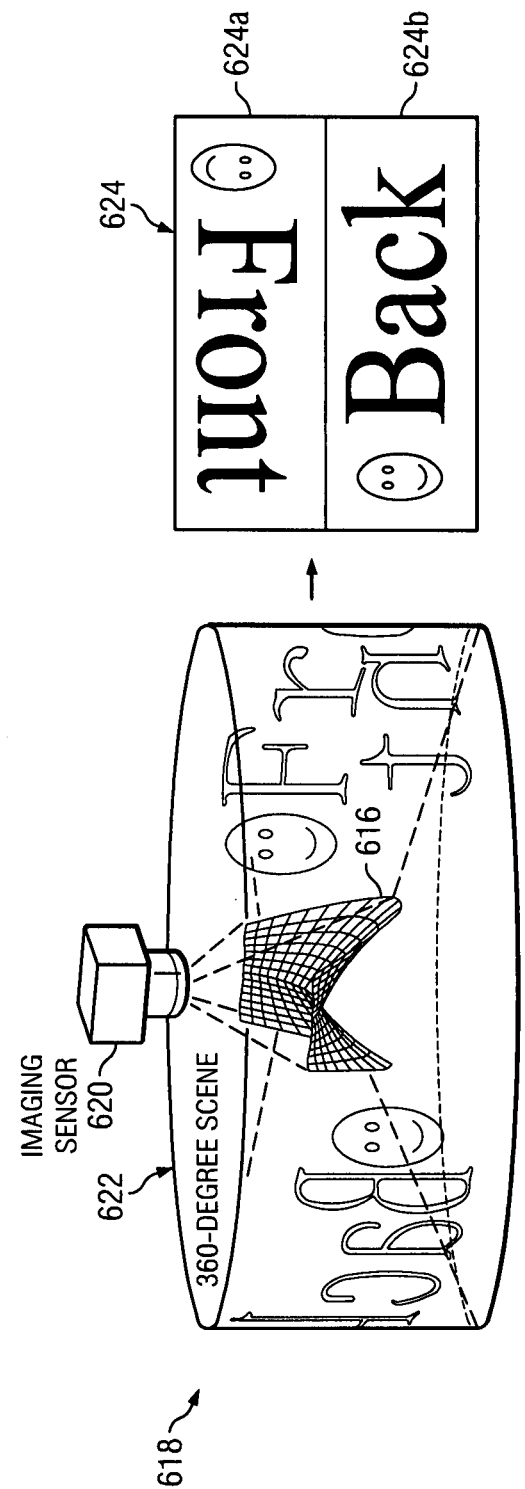

FIG. 6D is an illustration of an exemplary imaging system 618 that includes the freeform reflector 616 and imaging sensor system 620. The imaging system 618 captures an image of a scene represented by a panoramic cylinder 622. In this case, the scene includes the words, "Front" and "Back" with smiley faces before each word. In reflecting the scene from the panoramic cylinder 622 to the image sensor system 620, the freeform reflector 616 causes the word "Front" to be mapped upside down onto a top portion of an image sensor and word "Back" to be mapped right side up onto a bottom portion of an image sensor, such that the words as imaged onto the image sensor may be displayed on an electronic display 624, a top portion 624a and bottom portion 624b displaying the words "Front" and "Back" respectively.

Figure 7A:
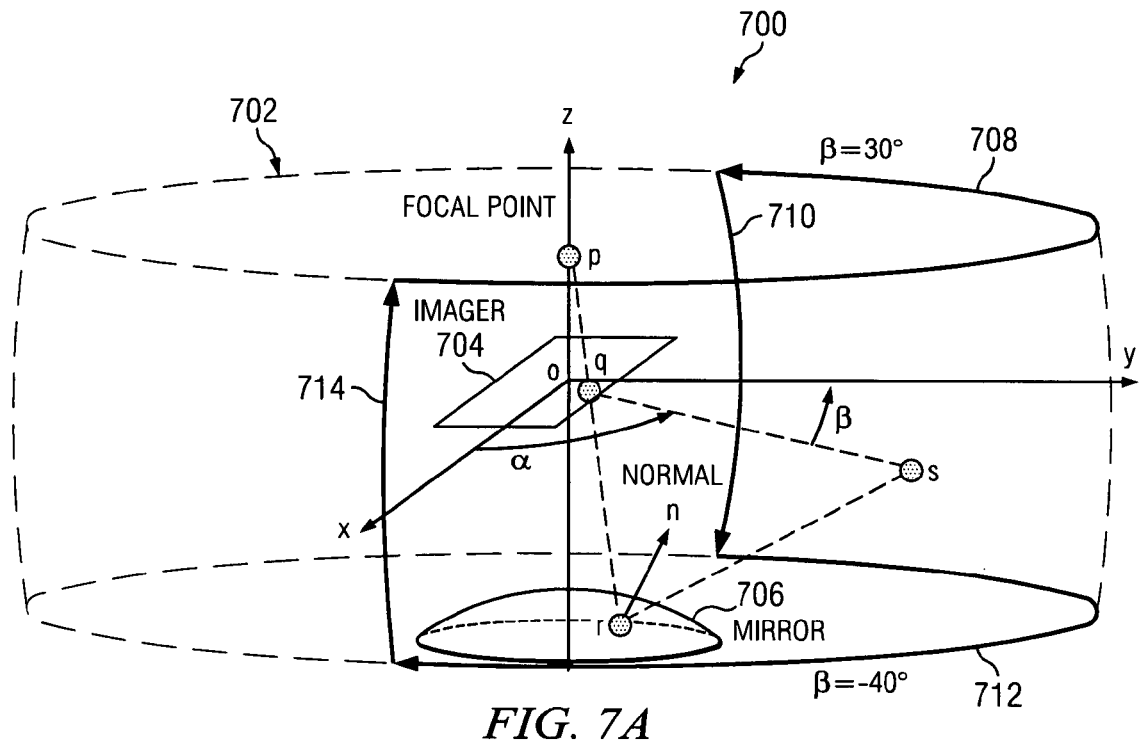
FIGS. 7A-7D are illustrations of an alternative embodiment of an exemplary coordinate system of panoramic imaging system showing another exemplary mapping for imaging onto an image sensor using a freeform reflector (FIG. 7C)
Figure 7B:
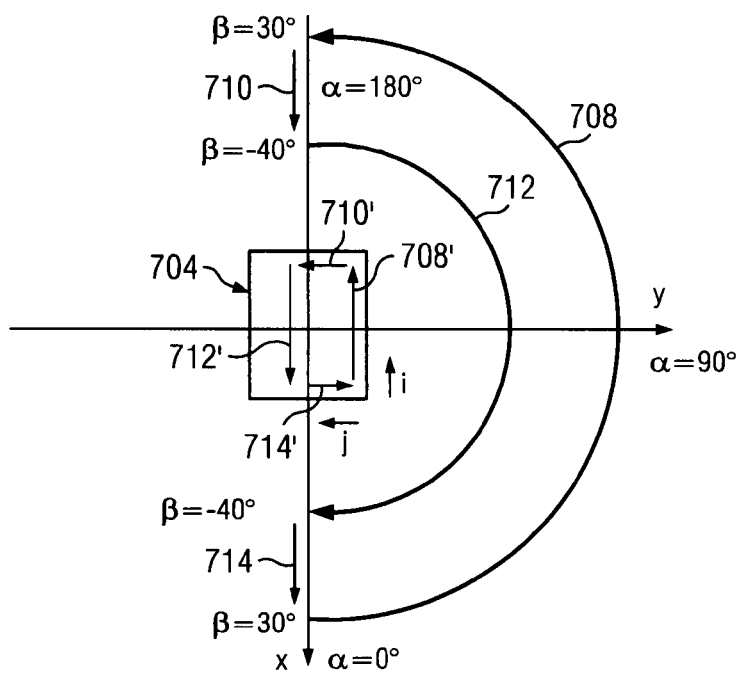
Figure 7C:
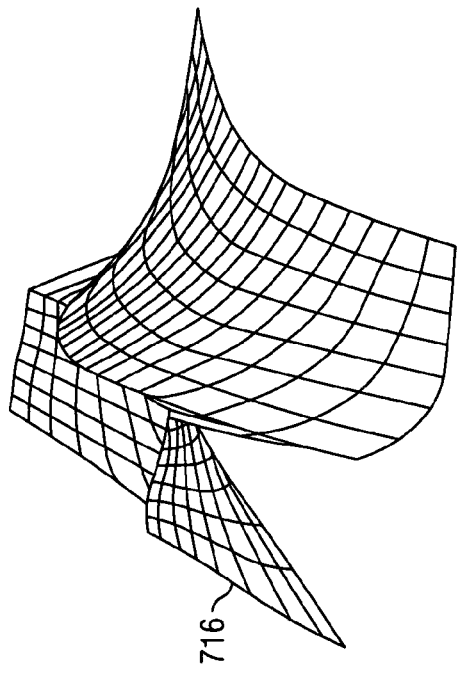

FIGS. 7A-7D are illustrations of an alternative embodiment of an exemplary coordinate system of a panoramic imaging system showing another exemplary mapping for imaging onto an image sensor using a freeform reflector (FIG. 7C). A panoramic cylinder 702 and image sensor 704 are shown to be the same or similar of those of FIG. 6A. In addition, scene paths 708-712 are the same or similar to those of FIG. 6A. The difference from FIGS. 6A and 6B is the mapping from the scene paths 708-714 onto the image sensor 704 with image paths 708'-714'. As shown, scene path 708 is mapped in this embodiment onto the image sensor 704 on a positive right edge of the image sensor 704 and ordered from a +x-axis side to a -x-axis side (as compared to scene path 608 being mapped onto the image sensor 604 at or near the x-axis). The other image paths 710', 712', and 714' are also mapped to different positions on the image sensor system 704 and ordered in different directions. Resulting from the different mapping and ordering from the panoramic cylinder 702 onto the image sensor 704 is a freeform reflector 706 being different from the freeform reflector 616 shown in FIG. 6C.

FIG. 7C is an illustration of an exemplary freeform reflector 716 that is defined by normal vectors resulting from a mapping of the scene on the panoramic cylinder 702 onto the image sensor system 704 of FIGS. 7A and 7B. The freeform reflector 716 provides a different mapping and order for the scene being imaged onto the image sensor 704 than freeform reflector 616 of FIG. 6C.

Figure 7D:
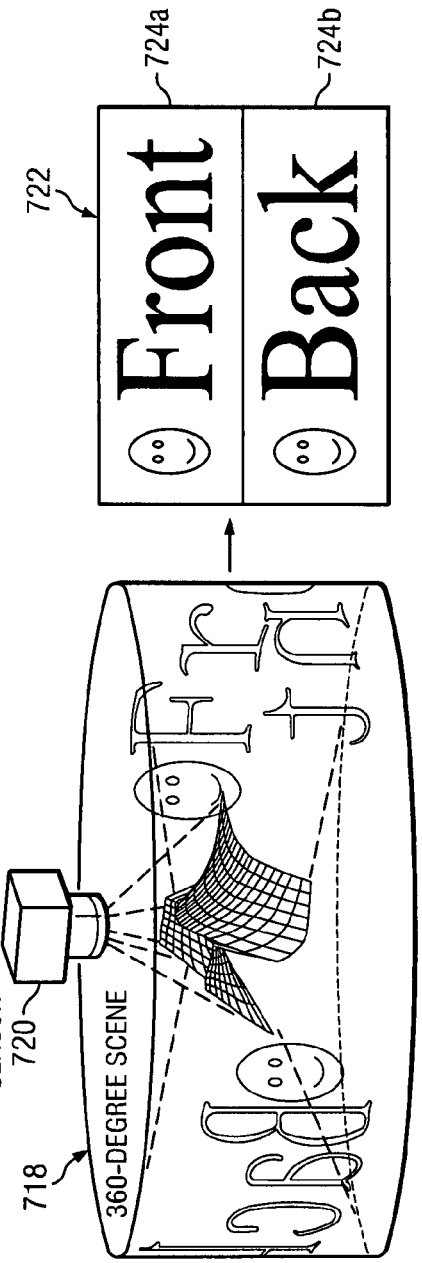

FIG. 7D is an exemplary scene represented by panoramic cylinder 718 being mapped by the freeform reflector 716 of FIG. 7C onto an image sensor system 720. The scene has the words "Front" and "Back" printed thereon with two smiley faces prior to each of the words. A resulting display 722 includes a top portion 724a and bottom portion 724b that has the words "Front" and "Back" written from left to right and both in a right-side up manner with the smiley faces being to the left of the words. By comparing FIGS. 6D and 7D, it should be recognized that the different shapes of the freeform reflective surfaces 616 and 716 cause the images of the scenes mapped and projected onto the image sensors 604 and 704, respectively, to be different. The ability to have mapping flexibility through use of the principles of the present invention to be used in a wide variety of applications.

Figure 8A:
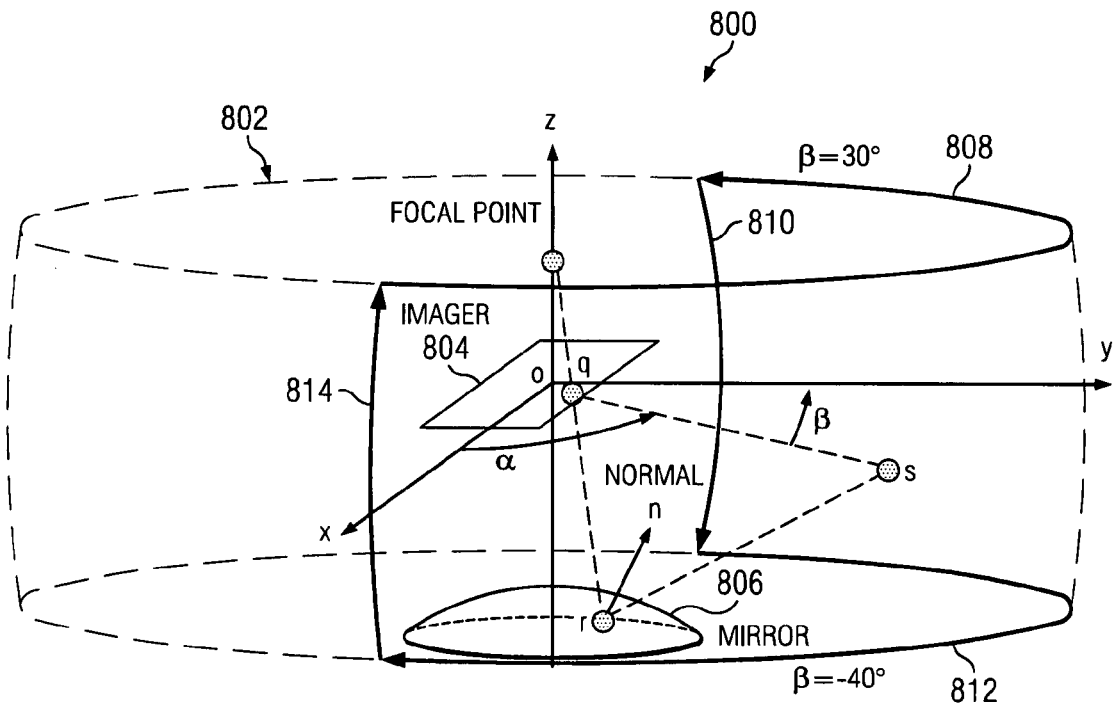
FIGS. 8A and 8B are illustrations of another alternative embodiment of an exemplary coordinate system of a panoramic imaging system showing another exemplary mapping for imaging onto an image sensor using a freeform reflector.
Figure 8B:
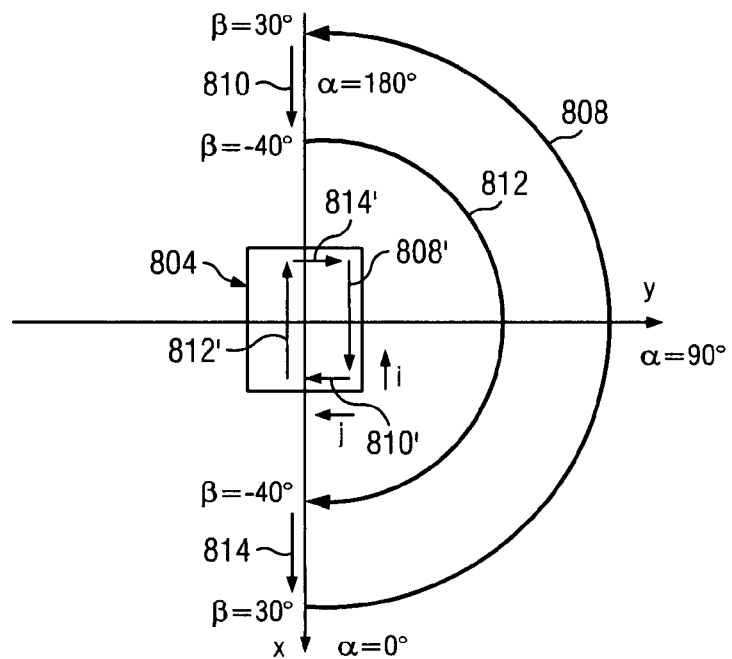

FIGS. 8A and 8B are illustrations of another alternative embodiment of an exemplary coordinate system of a panoramic imaging system 800 showing another exemplary mapping for imaging onto an image sensor 804 using a freeform reflector 806. A scene may be mapped from a panoramic cylinder 802 to the image sensor 804 to define the freeform reflector 806. In mapping the scent to the image sensor 804, scene paths 808, 810, 812, and 814 may be mapped to image paths 808', 810', 812', and 814', as described with regard to FIGS. 6A-6B and 7A-7B. In this embodiment, the paths and ordering are different from those shown in FIGS. 6B and 7B, thereby resulting in a different freeform reflector shape.

Figure 9A:
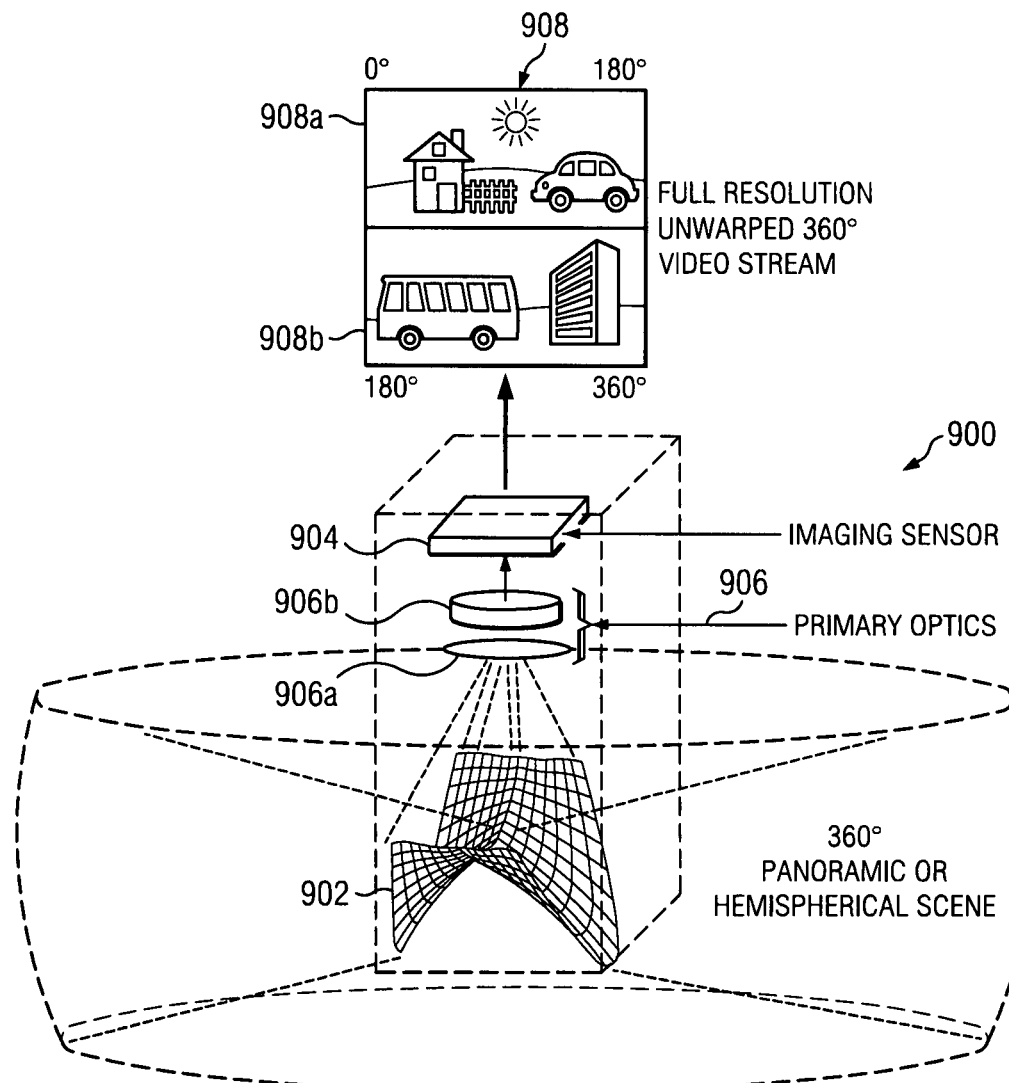
FIGS. 9 and 9B are illustrations of another exemplary embodiment of a panoramic imaging system that uses a freeform reflector.
Figure 9B:
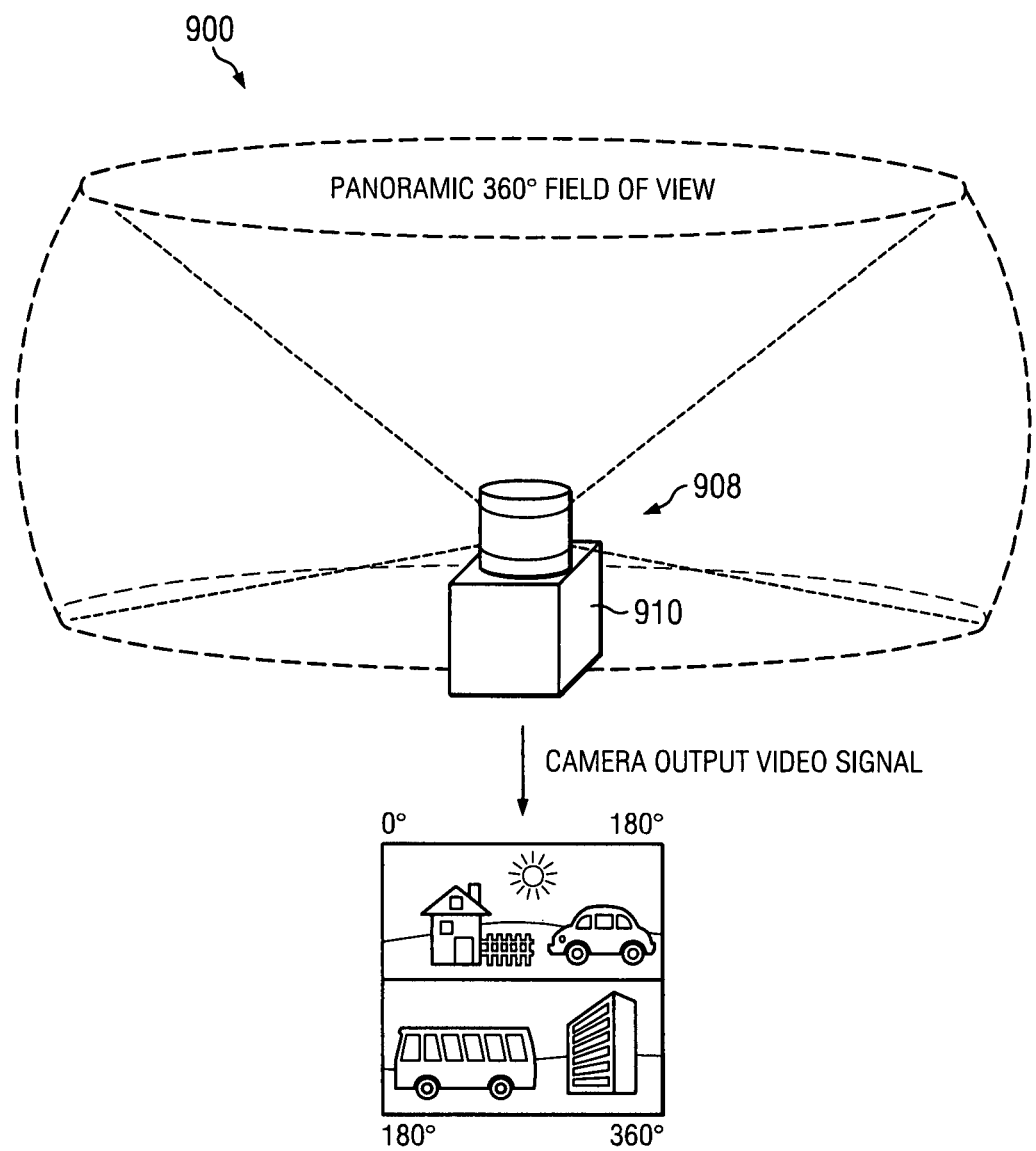

FIGS. 9A and 9B are illustrations of another exemplary embodiment of a panoramic imaging system that uses a freeform reflector. The panoramic imaging system 900 may include a freeform reflector 902 and image sensor 904. The image sensor 904 may be a CCD, CMOS, infrared (IR), or any other electromagnetic wavelength sensor. In one embodiment, sensor primary optics 906, which may include a first lens 906a and second lens 906b may be disposed in optical relation with the freeform reflector to cause electromagnetic signals (e.g., light beams) to be illuminated on the image sensor 904. The sensor primary optics 906 may result in a columnized and aberration corrected light being projected from the freeform reflector 902 onto the image sensor 904. It should be understood that a wide range of optical designs may be utilized in accordance with the principles of the present invention.

However, the use of primary optics does not affect the ability for the freeform reflector 902 to form an image of a scene on the image sensor 904 that substantially utilizes all or most of the pixels of the image sensor 904, thereby providing good resolution and substantially eliminating the need for post processing from the image sensor 904 to produce a scene image 908 having one or more portions of the scene being unwrapped and unwarped such that a viewer may readily understand the scene captured by the image sensor. As shown, the scene image includes a first portion 908a and a second portion 908b, where the first portion ranges from 0° to 180° and the second portion 908b ranges from 180° to 360° of the hemispherical scene.

Because the freeform mirror 902 enables the image sensing system 900 to operate without any moving parts, the imaging sensor system 900 may operate to capture both still and video images. In other words, since no moving parts are needed for the image sensing system 900, there is no need to take multiple images in different directions and then stitch them together using computer software. Furthermore, as shown in the scene image 908, image resolution is substantially evenly distributed over the entire 360° of the scene image 908 because the scene image 908 is mapped onto a large portion of the image sensor 904. Because the image resolution is evenly distributed throughout the scene image 908, a surveillance system using such a configuration may facilitate advanced image processing algorithms, such as target detection, for monitoring images within the scene and intelligent transportation systems. The advanced image processing algorithms may use the captured image without or with minimal correction (e.g., color correction). The advanced image processing algorithms may be used to perform a variety of different functions depending on the application, such as determining whether an object or person enters or moves within an image for a surveillance application. Furthermore, because no resampling on an original image on the image sensor 904 is performed, artifacts are not produced by post-processing software and image quality is preserved.

FIG. 9B shows the imaging system 900 with an image sensor system 910 having a housing 912 that the freeform reflector 902, image sensor 904, and sensor primary optics 906 of FIG. 9A may be encapsulated. An electronic display may be connected to or in communication with the image sensor system 910 for display of scenes captured by the image sensor 904.

Figure 10:
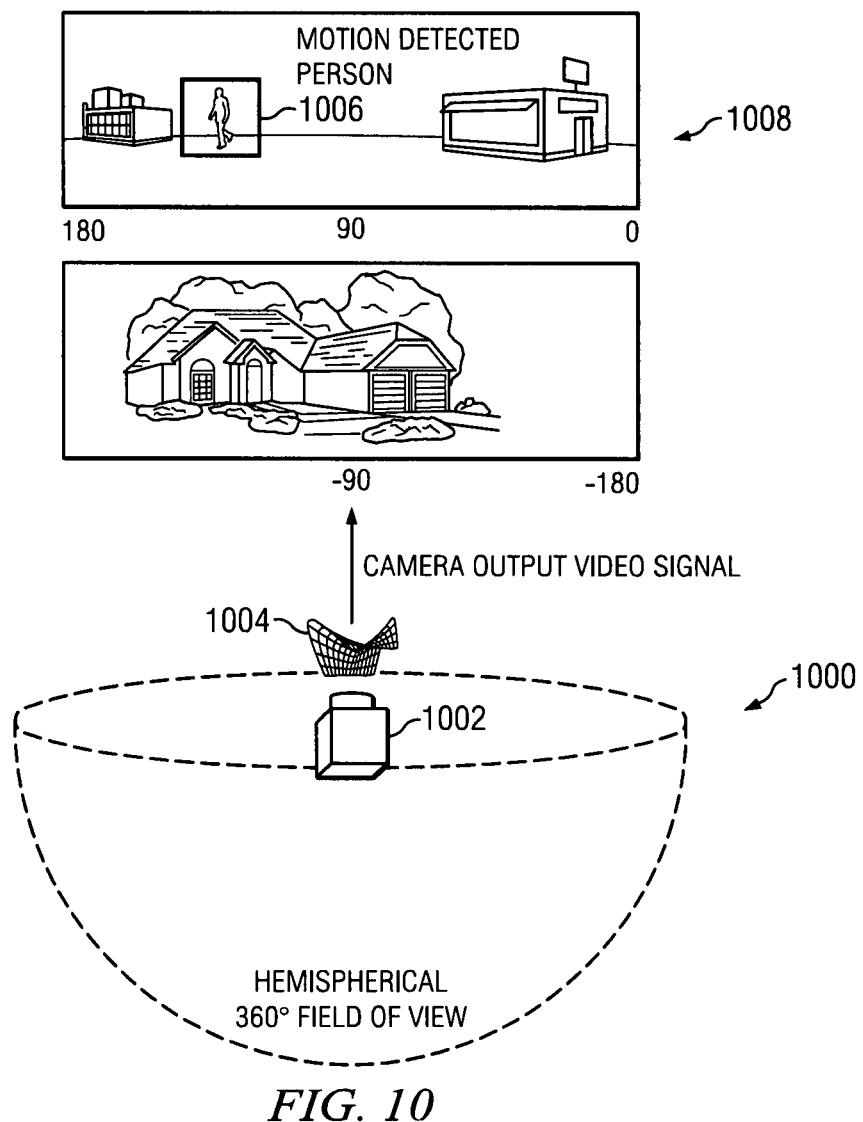
FIG. 10 is an illustration of an exemplary embodiment of a hemispherical imaging system.

FIG. 10 is illustration of an exemplary embodiment of a hemispherical imaging system. The image sensor system 1000 may be configured for acquiring a 360° hemispherical scene, where the entire 360° hemispherical scene is mapped onto a predetermined shaped sensor, such as a rectangular or otherwise configured image sensor. Rectangular shaped image sensors are common and typically used for imaging applications. However, other predetermined shaped image sensors may be utilized in accordance with the principles of the present invention. As previously described, the mapping of the 360° hemispherical scene may be the same or similar to mapping of the panoramic scene, where the scene is mapped into two 180° bands to form a full screen image. An image system 1002 that receives images from a freeform reflector 1004 may output an unwarped and unwrapped data stream of undistorted hemispherical video or photographs. Using such a configuration, no host computer or unwarping software is needed. However, in the case of the video being used for motion detection or other surveillance functionality, a computing system may be utilized for such purposes. However, the original video captured by the image processing system 1000 may be viewed with substantially no distortion or image processing. In a surveillance or motion detection system, a box 1006 or other graphical representation (e.g., arrow or other symbol or indicia) may be displayed on an output image 1008 to identify motion in the scene. In addition, words, such as "Motion Detected Person," may be displayed on the output image 1008.

Figure 11:
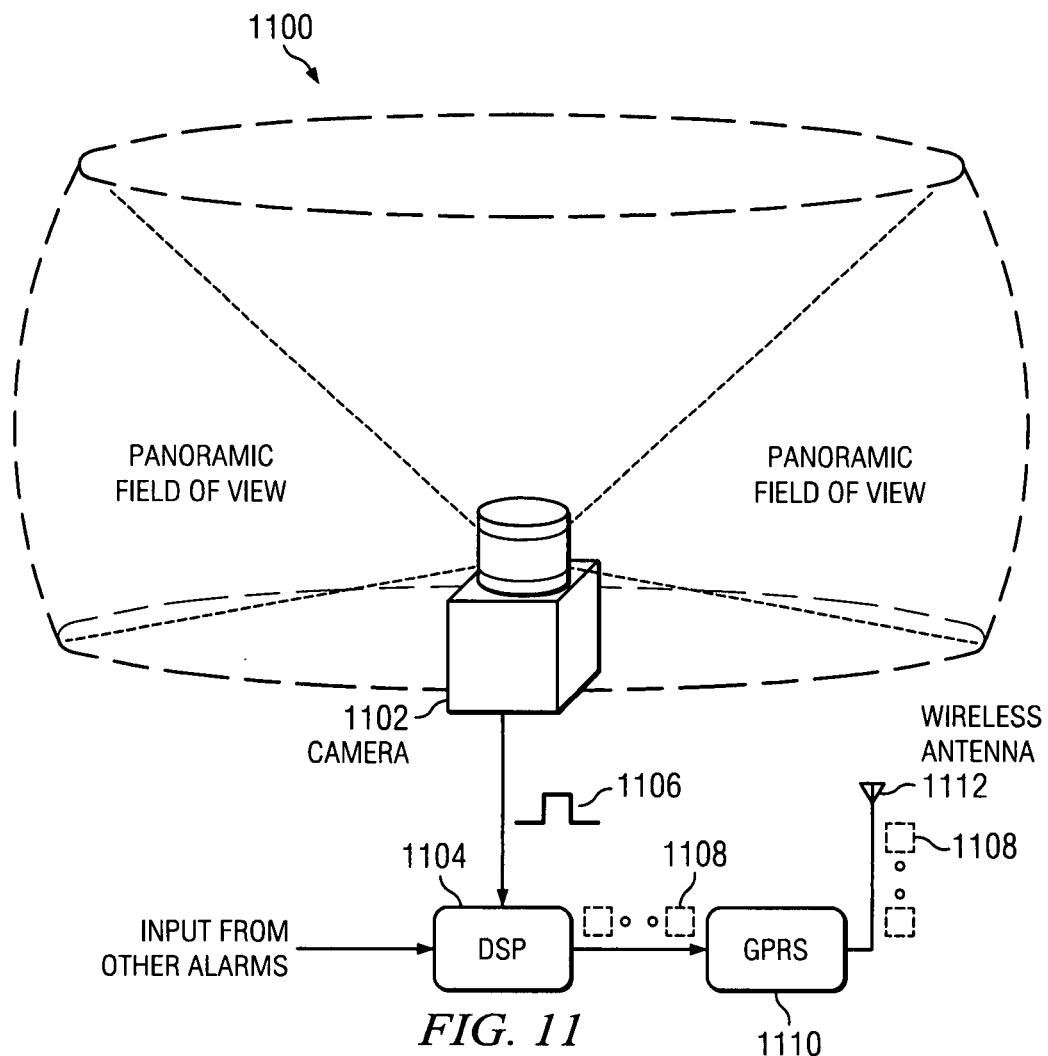
FIG. 11 is an illustration of another exemplary embodiment of a panoramic imaging system configured as a surveillance system.

FIG. 11 is an illustration of another exemplary embodiment of a panoramic imaging system 1100 configured as a surveillance system. The image capturing system 1100 may be configured as a "smart alarm" device for using in homes, offices, warehouses, and cars, for example. As described with regard to previous figures, a freeform reflector (not shown) may be used in an image sensor system 1102 to capture images of a scene in a panoramic view about the image sensor system 1102. The scene to be captured may be defined by the designer of the image sensor system 1102 to define the freeform mirror to be utilized for mapping the panoramic scene onto an image sensor chip within the image sensor system 1102. A digital signal processor 1104 may receive inputs from other alarms (e.g., door alarms, fire alarms, etc.) and process image signals 1106 that are generated by the image sensor system 1102 of the scene. The digital signal processor 1104 may utilize motion and intrusion detection algorithms, as understood in the art, to facilitate automatic detection and tracing of any suspicious moving object or stationary object in the areas that no one is supposed to enter.

If any suspicious activity is detected by the image capturing system 1100 that raises a security concern, an alert message or notification, which may be communicated in data packets 1108, may be communicated using a radio 1110, such as a general packet radio service (GPRS), to communicate the data packets 1108 via a wireless antenna 1112 to a communications network such as a cellular communications network. The alert message or messages may include one or more photographs or videos captured during a detected suspicious activity, text message, telephone call, or any other type of message. The alert message may be communicated to an owner's telephone number, email address, police, neighbors, or any other party that the owner desires to notify of a suspicious activity occurring within view of the image sensor system 1102. In one embodiment, a log of alert messages, photographs, videos, or other detection information may be created in a database or other data repository locally or on a network, such as the Internet.

Although shown as a wireless system, it should be understood that the principles of the present invention may also use wired communications systems, such as Ethernet or other wide area network communications systems. In one embodiment, a receiver of the message from the imaging system 1100 may utilize a mobile telephone, handheld wireless device, or any other computing system to control electronics or objects within the image sensing system 1100 to obtain additional details, images, or other information about the scene being captured. In one embodiment, a speaker and microphone (not shown) may be in communication with the digital signal processor 1104 to enable an owner or monitor to receive a message and communicate with whoever is near the device using a telephone, such as a mobile telephone or other computing system. In one embodiment, the GPRS 1110 may communicate voice over IP data packets and be in communication with the local wireless access points for communication over the internet or public switched telephone network. Because of the 360° imaging of the image sensor system 1102, false alarms may be reduced by enabling the receiver of a photograph to accurately determine whether a person or other object has entered into the field of view. It should be understood that a wide range of embodiments, communications possibilities, and alerts may be provided through use of the principles of the present invention.

Figure 12:
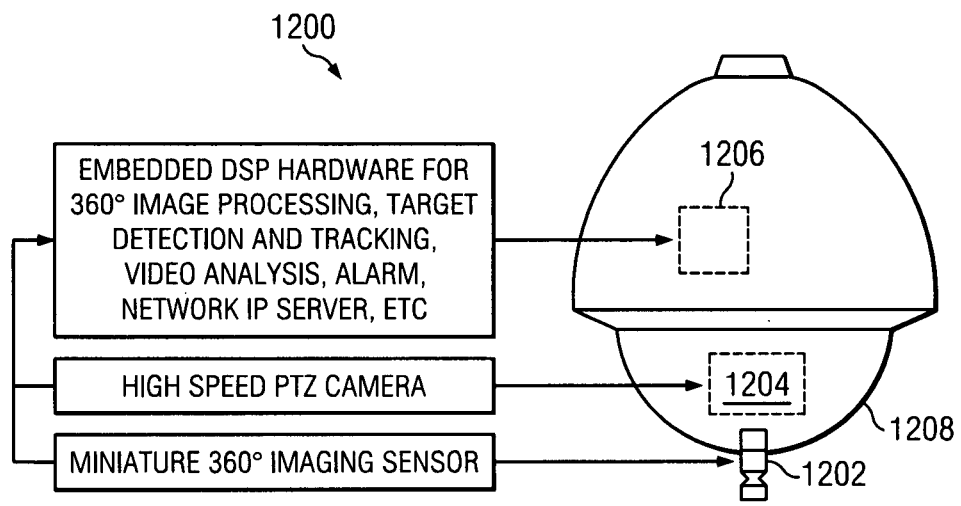
FIG. 12 is an illustration of an exemplary hemispherical imaging system configured to operate as a surveillance system.

FIG. 12 is an illustration of an exemplary hemispherical imaging system configured to operate as a surveillance system. The imaging system 1200 may include three components, a 360° imaging sensor 1202, high speed pan/tilt/zoom (PTZ) camera 1204, and embedded DSP hardware 1206 for performing image processing, target detection, target tracking, video analysis, alarm processing, network Internet Protocol (IP) server, and other functionality. The imaging sensor 1202 may be located within or extending from a dome 1208. The imaging sensor 1202 may be include a freeform reflector (not shown) that is configured to view a hemispherical scene and image the scene onto an image sensor that is rectangular in shape in a similar manner as described hereinabove such that no image processing may be needed to unwrap or unwarp the image, thereby enabling processing to be dedicated to monitoring movement and other surveillance functionality. By utilizing a 360° image sensor 1202, the full 360° scene may be continuously monitored, thereby having no "blind spots" due to a rotating camera, which is typically used in conventional domed imaging systems.

In one embodiment, the high speed PTZ camera 1204 may include pan/tilt/zoom capabilities to enable agile target search and track operation that does not require human operator intervention. The use of the high speed PTZ camera 1204 enables a second video stream to be viewed by a person to more closely monitor images within the 360° image scene, which is continuously monitored through use of the imaging sensor 1202. The image sensing system 1200 may also use a wireless communication radio to communicate data packets or otherwise with a communications system. Furthermore, the DSP 1206 may generate video images using any type of video protocol, including NTSC, PAL, MPEG3 or any other video format as understood in the art. Furthermore, the DSP 1206 may generate alerts and other messages in response to detecting movement or objects within the scene.

Figure 13A:
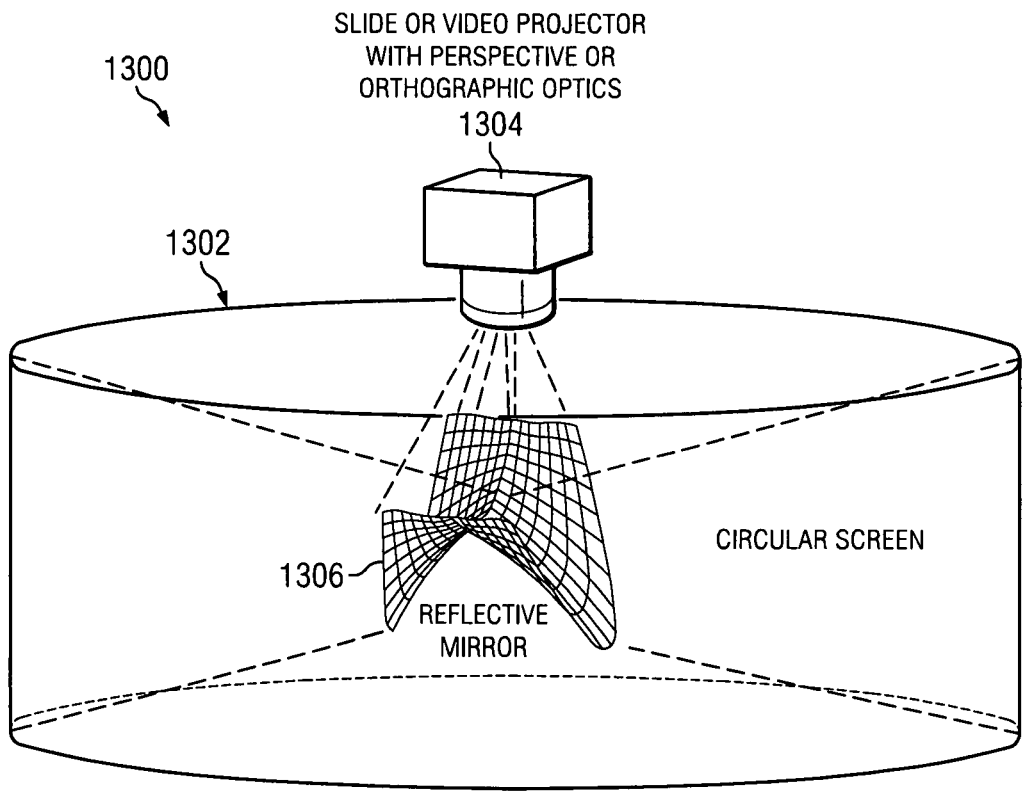
FIG. 13A is an illustration of an exemplary embodiment for using a freeform reflector for protecting images on a circular screen.

FIG. 13A is an illustration of an exemplary embodiment of a projection system 1300 for using a freeform reflector 1306 for projecting images on a circular screen 1302. It should be understood that other shaped screens may be utilized in accordance with the principles of the present invention. The circular screen 1302 may receive images projected by a slide or video projector 1304 with perspective or orthographic optics onto the freeform reflector 1306. It should be understood that other optics may be utilized in the projector 1304. The circular screen 1302 may be configured to display images on the inside of the circular screen where the circular screen is large enough for people to view the images displayed on the circular screen 1302 or be configured to enable the images projected onto the circular screen 1302 on the outside of the circular screen, as in a rear view projection screen.

Figure 13B:
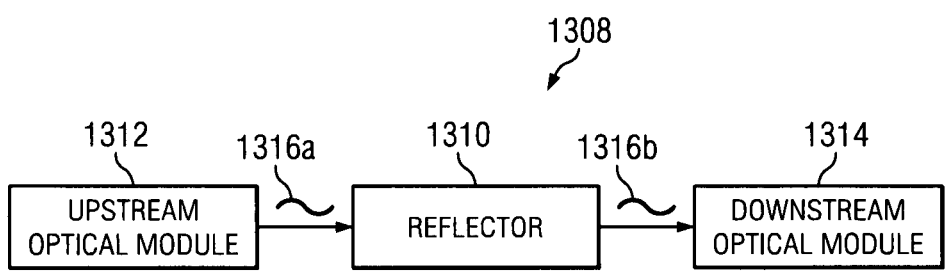
FIG. 13B is a block diagram of an exemplary projection system that utilizes a freeform reflector.

FIG. 13B is a block diagram of an exemplary projection system 1308 that utilizes a freeform reflector 1310. The projection system 1308 may include an upstream optical module 1312 and a downstream optical module 1314 with respect to the freeform reflector 1310. The upstream and downstream optical modules 1312 may include optical components, such as lenses, mirrors, or other optical components that are used in the projection system 1308. The upstream optical module 1312 may project electromagnetic signals 1316a onto the freeform reflector 1310, which, in turn, reflects the electromagnetic signals 1316a as electromagnetic signals 1316b to the downstream optical module 1314. Opposite to an image collection system, projection system 1308 uses the freeform reflector 1310 to map from a source of the electromagnetic signals 1316a at the upstream optical module 1312 to a wide angle field-of-view image scene (e.g., 360 degree projection screen) downstream of the downstream optical module 1314. The freeform reflector 1310 may define a mathematical function such that the image projected onto the wide angle field-of-view image scene is mapped from a rectangular coordinate system to a cylinder coordinate system and corrected for the coordinate system transformation.

Figure 14:
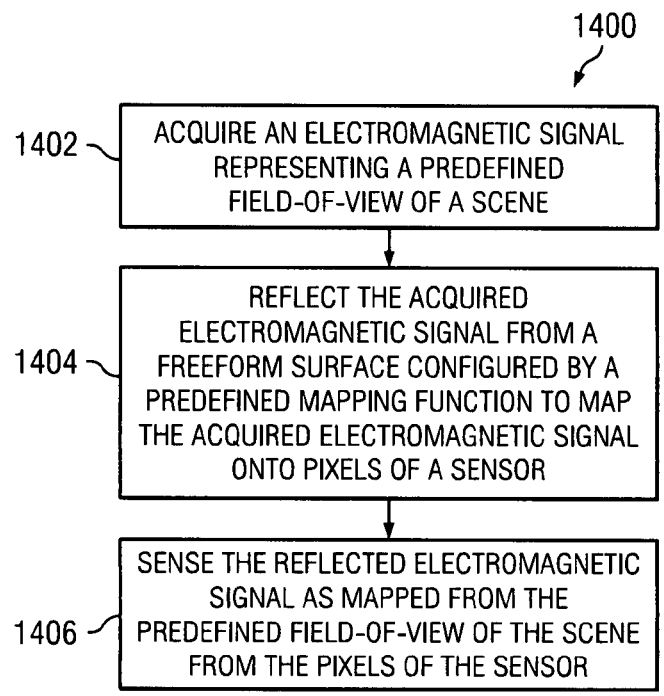
FIG. 14 is a flowchart of an exemplary process for collecting an electromagnetic signal.

FIG. 14 is a flowchart of an exemplary process 1400 for collecting an electromagnetic signal. The process 1400 starts at step 1402, where an electromagnetic signal representing a predefined field-of-view may be acquired. In one embodiment, the predefined field-of-view is a wide angle field-of-view. As previously described, a wide angle field-of-view may vary by application (e.g., surveillance, rearview mirror, etc.). The electromagnetic signal may be an optical signal, infrared signal, or any other signal at a different wavelength. At step 1404, the acquired electromagnetic signal may be reflected from a freeform surface configured by a predefined mapping function to map the acquired electromagnetic signal onto pixels of a sensor. The predefined mapping function may be one that maps a scene in a certain field-of-view (e.g., 360° field-of-view) having angular elevation angles between two angles, such as β=30° to β=−40°, for example. At step 1406, the reflected electromagnetic signal of the scene as mapped from the predefined field-of-view to the sensor may be sensed. When sending the reflected electromagnetic signal, no computation may be needed to post process the sensed signals as a mathematical function integrated into the preformed surface may cause the electromagnetic signal to be in a form that a human can interpret without computer correction.

Figure 15:
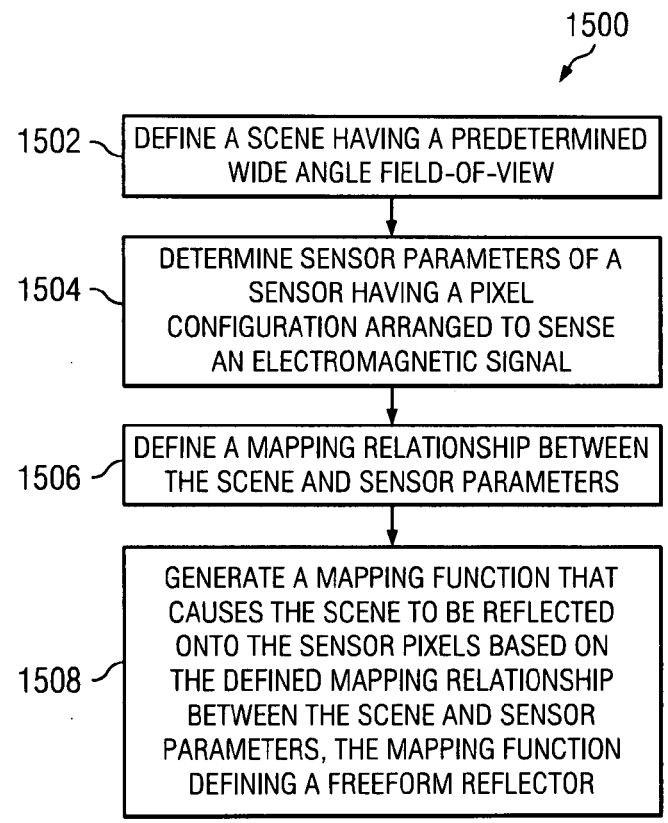
FIG. 15 is a flowchart of an exemplary process for designing a freeform reflector.

FIG. 15 is a flowchart of an exemplary process 1500 for designing a freeform reflector. The process 1500 may start at step 1502, where a scene having a predetermined wide angle field-of-view may be defined. At step 1504, sensor parameters of a sensor having a pixel configuration arranged to sense an electromagnetic signal may be determined. In determining the sensor parameters, length and width of a sensor or of a number of pixels of the sensor may be determined such that a mapping relationship between the scene and sensor parameters may be defined at step 1506. The mapping relationship may be determined by the scene parameters, such as field of view, angle and height and size of a sensor, thereby enabling a designer to generate a mapping function that causes the scene to be reflected onto the sensor pixels based on the defined mapping relationship between the scene and sensor parameters at step 1508. The mapping function as generated may define a freeform reflector that may be used in mapping the scene onto the sensor.

Figure 16:
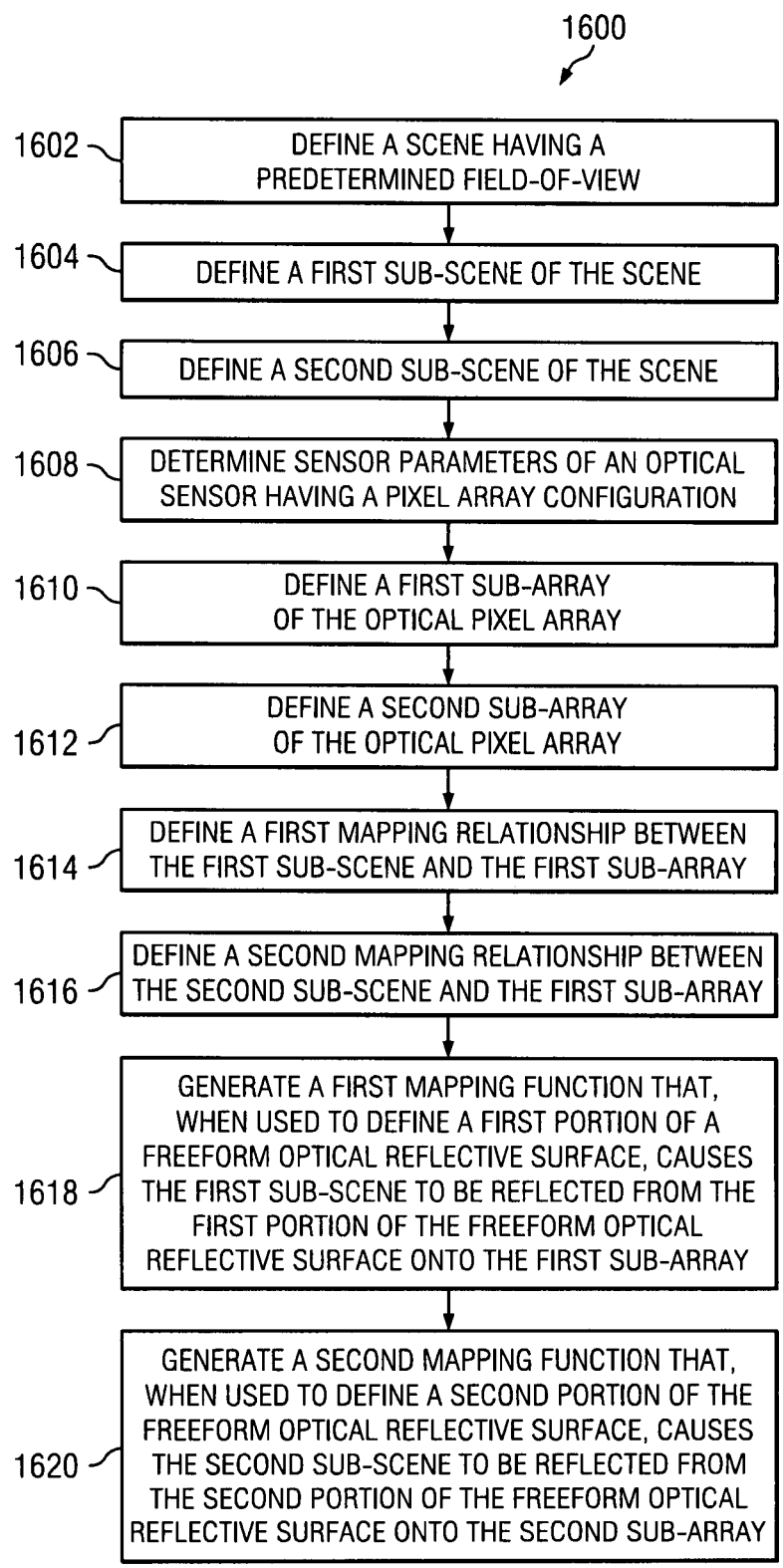
FIG. 16 is a flowchart of an exemplary process for designing a mirror.

FIG. 16 is a flowchart of an exemplary process 1600 for designing a mirror. The process starts at step 1602, where a scene having a predetermined field-of-view may be defined. At step 1604, a first sub-scene of the scene may be defined. At step 1606, a second sub-scene of the scene may be defined. At step 1608, sensor parameters of an optical sensor having a pixel array configuration may be determined. At step 1610, a first sub-array of the optical pixel array may be defined. At step 1612, a second sub-array of the optical pixel array of the pixel array may be defined. The first and second sub-arrays of the optical pixel array may be an upper half and a lower half of the pixel array, such that the first and second sub-scenes of the scene may be imaged onto the two different sub-arrays, thereby eliminating the need to correct for images displayed on the pixel array.

At step 1614, a first mapping relationship between the first sub-scene in the first sub-array may be defined. At step 1616, a second mapping relationship between the second sub-scene and the second sub-array may be defined. At step 1618, a first mapping function that, when used to define a first portion of a freeform optical reflective surface, causes the first sub-scene to be reflected from the first portion of the freeform optical reflective surface onto the first sub-array may be generated. At step 1620, a second mapping function that, when used to define a second portion of the freeform optical reflective surface, causes the second sub-scene to be reflected from the second portion of the freeform optical reflective surface onto the second sub-array may be generated. By generating the first and second mapping functions, the entire scene may be imaged onto different portions of the optical sensor so that no image correction is needed thereafter.

While much of the previous description focuses on imaging formation optics, it should be understood that the principles of the present invention provide for reversing the direction of the optical path such that substantially the same reflector and design methodology can be applied to design and implement illumination and/or image display systems. Many modifications and variations will be apparent to those of ordinary skill in the art.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A wide angle reflector device, comprising:
   a freeform surface being reflective and having a shape defined by a mapping to reflect and map a light beam onto a sensor defined by pixels arranged in a predetermined shape, the freeform surface having a physical geometric configuration that maps the scene onto the sensor substantially free of distortion.

2. The reflector device according to claim 1, wherein the reflective surface is an optical reflective surface.

3. The reflector device according to claim 2, wherein the light beam defines an optical image having a field-of-view between approximately 30 degrees up to approximately 120 degrees.

4. The reflector device according to claim 1, wherein the mapping causes the light beam to be redistributed when imaged on the sensor.

5. The reflector device according to claim 4, wherein the redistribution of the light beam implements a mathematical function such that the light beam mapped onto the sensor is a corrected signal that does not need to be corrected digitally or otherwise.

6. The reflector device according to claim 1, wherein the sensor is a CCD or CMOS image sensor chip.

7. The reflector device according to claim 6, wherein reflector is configured to reflect a wide angle field-of-view image that covers substantially the entire image sensor chip.

8. The reflector device according to claim 1, wherein the reflector has a surface that is curvilinear.

9. The reflector device according to claim 8, wherein the surface includes linear and non-linear regions.

10. The reflector device according to claim 1, wherein the light beam defines and optical image having a field-of-view ranging up to 360 degrees.

11. The reflector device according to claim 1, wherein the mapping defines a predetermined distribution of the light beam onto the sensor.

12. The reflector device according to claim 1, wherein the predetermined distribution of the light beam is scalar and mathematically correct.

13. The reflector device according to claim 1, wherein the predetermined shape of pixel arrangement is a geometric shape.

14. The reflector device according to claim 1, wherein the reflector has a surface profile defined by vector manipulation of an incident ray and a reflected ray to compute a normal vector.

15. The reflector device according to claim 1, wherein the reflector has a surface freeform surface that is defined by a composite of normal vectors across reflection points.

16. The reflector device according to claim 1, wherein the reflector has a surface defined by mapping source points along a panoramic cylinder onto the sensor.

17. The reflector device according to claim 1, wherein the reflector has a surface that is a function of how a designer desires to map a scene on the sensor.

18. The reflector device according to claim 1, wherein the sensor converts mapped images received into electronic signals that are displayed by an electronic display.

19. The reflector device according to claim 1, wherein the reflector surface shape allows an image sensing system in which the reflector is included to operate without out any moving parts.

20. The reflector device according to claim 1, wherein the sensor has a predetermined shape.

* * * * *